US011603487B2

(12) United States Patent
Deville et al.

(10) Patent No.: US 11,603,487 B2
(45) Date of Patent: *Mar. 14, 2023

(54) LOW MOLECULAR MASS ORGANIC GELATOR WELLBORE STABILIZERS

(71) Applicant: Halliburton Energy Services, Inc., Houston, TX (US)

(72) Inventors: Jay Paul Deville, Spring, TX (US); Preston Andrew May, Porter, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 33 days.

This patent is subject to a terminal disclaimer.

(21) Appl. No.: 16/887,593

(22) Filed: May 29, 2020

(65) Prior Publication Data

US 2021/0371720 A1    Dec. 2, 2021

(51) Int. Cl.
| | |
|---|---|
| *E21B 43/26* | (2006.01) |
| *C09K 8/04* | (2006.01) |
| *C09K 8/035* | (2006.01) |
| *E21B 33/13* | (2006.01) |
| *E21B 43/16* | (2006.01) |

(52) U.S. Cl.
CPC .............. *C09K 8/04* (2013.01); *C09K 8/035* (2013.01); *E21B 33/13* (2013.01); *E21B 43/16* (2013.01); *E21B 43/26* (2013.01)

(58) Field of Classification Search
CPC ........... C09K 8/04; C09K 8/035; E21B 43/26; E21B 43/16
See application file for complete search history.

(56) References Cited

U.S. PATENT DOCUMENTS

| | | | |
|---|---|---|---|
| 6,498,988 B1 * | 12/2002 | Robert | G01V 11/00 |
| | | | 702/6 |
| 8,220,543 B2 | 7/2012 | Clark et al. | |
| 2002/0034481 A1 * | 3/2002 | Bianchi | A61K 8/8111 |
| | | | 424/65 |
| 2008/0039347 A1 | 2/2008 | Welton et al. | |
| 2010/0256023 A1 | 10/2010 | Pauls et al. | |
| 2013/0112413 A1 | 5/2013 | Muthusamy et al. | |
| 2013/0213657 A1 | 8/2013 | Dobson, Jr. et al. | |
| 2014/0121134 A1 | 5/2014 | Kuri et al. | |
| 2014/0303049 A1 | 10/2014 | Holdsworth | |

(Continued)

OTHER PUBLICATIONS

Van Bommel et al., "Responsive Cyclohexane-Based Low-Molecular Weight Hydrogelators with Modular Architecture," Angew. Chem. Int. Ed. 2004, 43, 1663-1667.

(Continued)

*Primary Examiner* — Silvana C Runyan
(74) *Attorney, Agent, or Firm* — Thomas Rooney; C. Tumey Law Group PLLC

(57) ABSTRACT

Compositions and methods for using those compositions to at least partially stabilize subterranean formations are provided. In one embodiment, the methods include providing a treatment fluid including an aqueous base fluid and an additive including a low molecular mass organic gelator; introducing the treatment fluid into at least a portion of a subterranean formation to contact at least a portion of the subterranean formation that includes shale; and allowing the additive to interact with the shale to at least partially stabilize the shale.

17 Claims, 7 Drawing Sheets

(56) References Cited

U.S. PATENT DOCUMENTS

| | | | | |
|---|---|---|---|---|
| 2014/0378617 A1* | 12/2014 | Wilson | ................ | C08F 293/005 |
| | | | | 525/291 |
| 2015/0013984 A1* | 1/2015 | Abivin | ..................... | C09K 8/03 |
| | | | | 166/300 |
| 2016/0214896 A1* | 7/2016 | Cad | .......................... | C09K 8/62 |
| 2016/0251564 A1* | 9/2016 | Gamage | .................. | C04B 28/08 |
| | | | | 507/226 |
| 2017/0174917 A1* | 6/2017 | Adamic | ................. | C09D 11/36 |
| 2017/0247596 A1* | 8/2017 | May | ....................... | C09K 8/516 |

OTHER PUBLICATIONS

Van Oort et al., "Manipulation of Coupled Osmotic Flows for Stabilisation of Shales Exposed to Water-Based Drilling Fluids," SPE 30499.

Van Oort., "On the Physical and Chemical Stability of Shales," J. Pet. Sci. Eng. 2003, 38, 213-235.

Panda et al., "Stimuli Responsive Self-Assembled Hydrogel of a Low Molecular Weight Free Dipeptide with Potential for Tunable Drug Delivery," Biomacromolecules, 2008, 9, 2244-2250.

Liu et al., "A Supramolecular Shear-Thinning Anti-Inflammatory Steroid Hydrogel," Adv. Mater. 2016, 28, 6680-6686.

Estroff et al., "Water Gelation by Small Organic Molecules," Chem. Rev. 2004, vol. 104, No. 3.

International Search Report and Written Opinion issued in related PCT Application No. PCT/US2020/036260 dated Feb. 26, 2021, 11 pages.

Meazza, Lorenzo, et al. "Halogen-bonding-triggered supramolecular gel formation." Nature chemistry 5.1 (2013) 42-47.

* cited by examiner

LOW MOLECULAR MASS ORGANIC GELATOR WELLBORE STABILIZERS

BACKGROUND

The present disclosure relates to systems and methods for drilling and/or treating subterranean formations. Treatment fluids can be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, acidizing operations, scale dissolution and removal, consolidation operations, and the like. For example, a fluid may be used to drill a wellbore in a subterranean formation or to complete a wellbore in a subterranean formation, as well as numerous other purposes. A drilling fluid, or "mud" which a drilling fluid is also often called, is a treatment fluid that is circulated in a wellbore as the wellbore is being drilled to facilitate the drilling operation. The various functions of a drilling fluid include removing drill cuttings from the wellbore, cooling and lubricating the drill bit, aiding in support of the drill pipe and drill bit, and providing a hydrostatic head to maintain the integrity of the wellbore walls and prevent well blowouts.

During drilling of subterranean wellbores, various strata that include reactive shales may be encountered. Shales include materials such as heterogeneous, sedimentary rock that contains clay minerals (for example, bentonite). Reactive shales may be problematic during drilling operations because of, among other factors, their tendency to degrade (e.g., swell, disperse) when exposed to aqueous media such as aqueous-based drilling fluids. This degradation may result in undesirable drilling conditions and undesirable interference with the drilling fluid. For instance, shale degradation may interfere with attempts to maintain the integrity of drilled cuttings traveling up the wellbore until the cuttings can be removed by solids control equipment located at the surface. Similar problems may be caused by shales degrading due to dispersion, increasing the solids content of wellbore fluids. Additionally, certain shales may not be significantly permeable and, as a result, may be subject to pore pressure transmission, where fluid from a drilling fluid enters shale pores and increases the pore pressure. This may lower the effective overburden of the drilling fluid and may lead to significant wellbore instability.

Shale disintegration also may impact "equivalent circulating density" ("ECD"). ECD may be affected by the solids content of the drilling fluid, which may increase if solids control equipment is not effective at removing shale from the drilling fluid. Maintenance of appropriate ECD may be important in drilling a wellbore, where a narrow tolerance may exist between the weight of the drilling fluid needed to control the formation pressure and the weight of the drilling fluid that will fracture the formation. In such circumstances, minimizing shale degradation may be desirable to control of the viscosity of the drilling fluid. Moreover, degradation of drilled cuttings prior to their removal at the surface may prolong drilling time because shale particles traveling up the wellbore may break up into smaller and smaller particles, which may expose new surface area of the shale particles to the drilling fluid and lead to further absorption of water and degradation.

Shale degradation may also substantially decrease the stability of the wellbore, which may cause irregularities in the diameter of the wellbore (e.g., the diameter of some portions of the wellbore may be either smaller or greater than desired). In an extreme case, shale degradation may decrease the stability of the wellbore to such an extent that the wellbore collapses. Degradation of the shale may also interrupt circulation of the drilling fluid, cause greater friction between the drill string and the wellbore, and/or cause the drill string to become stuck in the wellbore.

BRIEF DESCRIPTION OF THE DRAWINGS

These drawings illustrate certain aspects of some of the embodiments of the present disclosure and should not be used to limit or define the claims.

Figure 1:
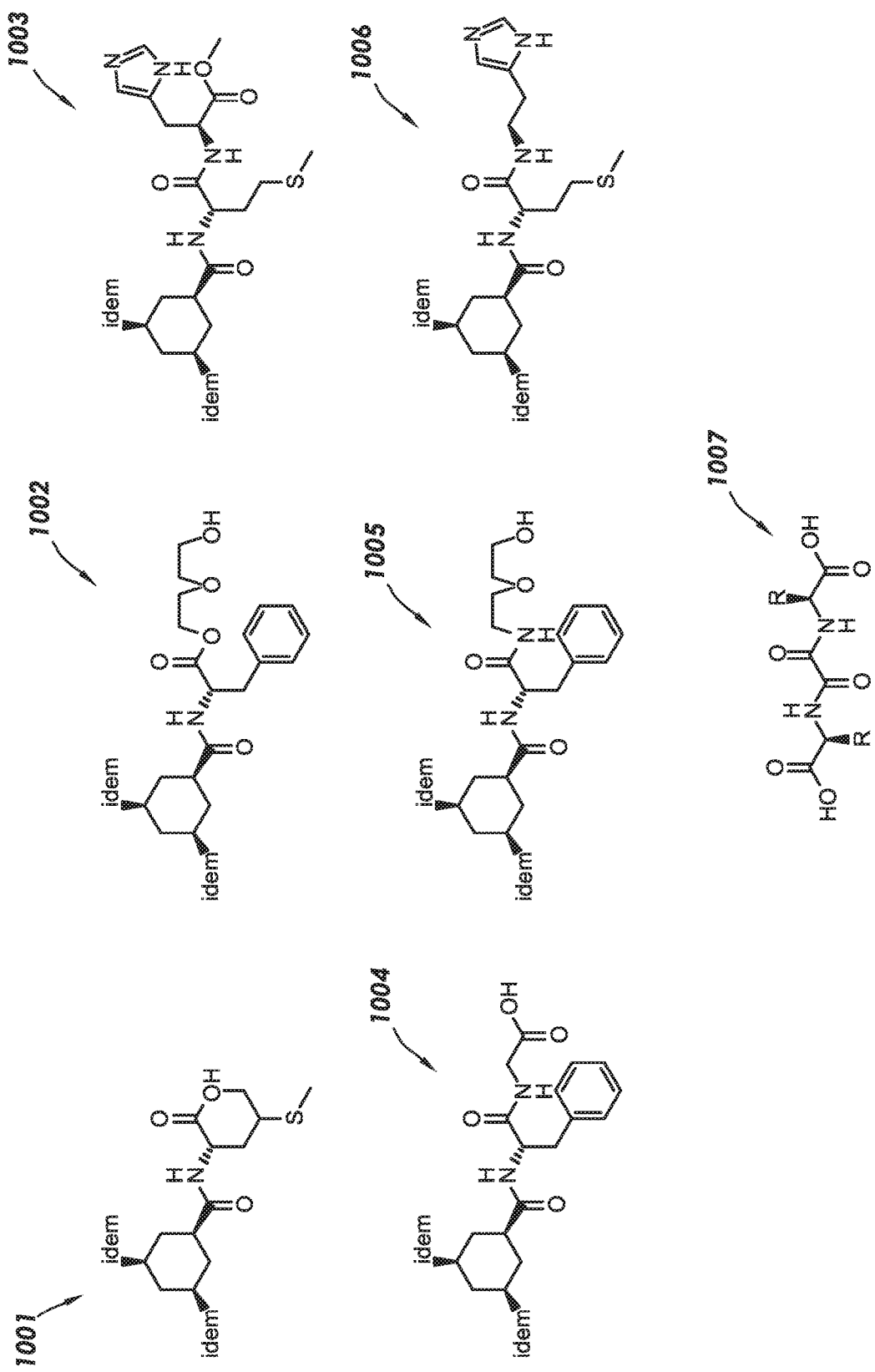
FIG. 1 is a diagram illustrating the chemical structures of amino acid-based low molecular mass organic gelators in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to compositions and methods for drilling and/or treating subterranean formations that include shale. More particularly, the present disclosure relates to additives for subterranean drilling and/or treatment fluids that include low molecular mass organic gelators.

The present disclosure provides methods including providing a treatment fluid including an aqueous base fluid and an additive including a low molecular mass organic gelator; introducing the treatment fluid into at least a portion of a subterranean formation to contact at least a portion of the subterranean formation that includes shale; and allowing the additive to interact with the shale to at least partially stabilize the shale. In certain embodiments, the methods include drilling at least a portion of a wellbore to penetrate at least a portion of a subterranean formation that includes shale; circulating a drilling fluid in at least a portion of the wellbore while drilling at least a portion of the wellbore, the drilling fluid including an aqueous base fluid and an additive including a low molecular mass organic gelator; and allowing the additive to interact with the shale in the subterranean formation to at least partially stabilize the shale. In some embodiments, the present disclosure provides a composition that includes: an aqueous base fluid; an additive including a low molecular mass organic gelator; and one or more salts, the composition having a density of from about 9 ppg to about 20 ppg.

In some embodiments, the methods and compositions of the present disclosure may provide an additive that acts, inter alia, as wellbore stabilizers. In some embodiments, such additives may be sufficiently small or sufficiently of low molecular mass to pass through the pores of a filter cake and into the shale of a formation and/or small enough to pass into the pores of the subterranean formation. In certain embodiments, several different mechanisms may stabilize shale and/or other materials in subterranean formations or wellbores, including but not limited to inhibition through viscosification or gelation of fluid in the subterranean formation or shale (e.g., pore fluid). In certain embodiments, viscosification or gelation of fluid in the shale may reduce infiltration of fluid into the shale by lowering effective shale permeability, resulting in improved wellbore stability. As referenced herein, the phrase "stabilize shale," "stabilize wellbore," or variants thereof, refers to the action of one or more different inhibition mechanisms, either individually or collectively. As used herein, the term "stabilizing" and variants thereof do not imply any particular degree of stabilization, whether partial or otherwise.

Among the many potential advantages to the methods and compositions of the present disclosure, only some of which are alluded to herein, the methods, compositions, and systems of the present disclosure may stabilize wellbores and/or shale more effectively than conventional wellbore stabilizing additives and may at least partially eliminate the need for such other wellbore stabilizing additives. In certain embodiments, the methods and compositions of the present disclosure may cause less formation damage than conventional wellbore stabilizers, shale inhibitors, or clay inhibitors. In certain embodiments, removal of conventional wellbore stabilizers (e.g., polymeric shale stabilizers) may require breaking covalent bonds with an enzyme or oxidizer, which may not fully oxidize or break up the stabilizers, causing formation damage. The additives of the present disclosure may form a gel or viscosified fluid with the pore fluid in shale that may be almost completely or substantially completely broken and removed. Additionally, conventional wellbore stabilizers may include molecules that are too large to pass through a filter cake and enter the subterranean formation. In some embodiments, the additives of the present disclosure do not viscosify or gel a fluid until contacting the subterranean formation, allowing ease of pumping and handling compared to conventional viscosifying or gelling agents that would viscosify the fluid prior to contacting the subterranean formation.

In certain embodiments, the additives of the present disclosure may include one or more low molecular mass organic gelators. In some embodiments, low molecular mass organic gelators may include water-soluble organic molecules. In some embodiments, the low molecular mass organic gelator may have an average molecular weight of about 100,000 g/mol or less, of about 10,000 g/mol or less, or of about 1,000 g/mol or less. In certain embodiments, the molecular weight of the low molecular mass organic gelator may be in the range of from about 100 g/mol to about 100,000 g/mol, from about 100 g/mol to about 10,000 g/mol, from about 10 g/mol to about 1,000 g/mol, from about 250 g/mol to about 5,000 g/mol, or from about 5,000 g/mol to about 10,000 g/mol. In some embodiments, a low molecular mass organic gelator may be sufficiently small or sufficiently of low molecular mass to pass through the pores of a filter cake and into a subterranean formation.

In some embodiments, a low molecular mass organic gelator may be sufficiently small or sufficiently of low molecular mass or size to pass through the pores of a filter cake and into the subterranean formation. For example, in certain embodiments, a low molecular mass organic gelator may be introduced into a wellbore including a filter cake, or a filter cake may be formed while a low molecular mass organic gelator is circulating in a wellbore. At least a portion of the low molecular mass organic gelator in the additive may pass through the filter cake into the subterranean formation. In some embodiments, a portion of the low molecular mass organic gelator may contact aqueous pore fluids in the subterranean formation and viscosify and/or gel the pore fluid (e.g., by forming a hydrogel). In certain embodiments, pore fluid may include, but is not limited to, water, hydrocarbons, salts, minerals, and any combination thereof. In certain embodiments, the low molecular mass organic gelator may not significantly viscosify or gel a treatment fluid until it contacts the subterranean formation.

In certain embodiments, the low molecular mass organic gelator may be sufficiently small or sufficiently of low molecular mass or size to pass through the pores of shale in a subterranean formation. For example, at least a portion of the low molecular mass organic gelator in the additive of the present disclosure may pass into the shale of a subterranean formation. In some embodiments, a portion of the low molecular mass organic gelator may contact aqueous pore fluids in the subterranean formation and viscosify and/or gel the pore fluid (e.g., by forming a hydrogel).

In some embodiments, and without wishing to be limited by theory, a low molecular mass organic gelator may viscosify a water-based fluid primarily through hydrogen bonding and supramolecular interactions (e.g., hydrophobic interactions, pi-pi stacking, Van der Waals forces) and generally not through covalent bonding. In some embodiments, the low molecular mass organic gelators and/or treatment fluids of the present disclosure may not include or act as a surfactant. In some embodiments, the treatment fluids of the present disclosure may be substantially and/or entirely free of any surfactants. In certain embodiments, the low molecular mass organic gelator may not significantly impact surface tension characteristics of the treatment fluid and/or surfaces in a formation. For example, in certain embodiments, a low molecular mass organic gelator may not significantly reduce surface tension. In some embodiments, a low molecular mass organic gelator may not reduce surface tension below 30 mN/m, below 40 mN/m, or below 50 mN/m. In certain embodiments, the low molecular mass organic gelator may not include a viscoelastic compound (e.g., a viscoelastic surfactant).

Examples of low molecular mass organic gelators suitable for certain embodiments of the present disclosure include, but are not limited to amino acid-based compounds, urea compounds, pyridine compounds, cyclohexane-based compounds, and any combination thereof. In some embodiments, a low molecular mass organic gelator many include compounds having $C_3$ rotational symmetry (e.g., the compound does not change after 120° rotation about at least one axis).

In certain embodiments, the low molecular mass organic gelator may include one or more amino acid-based moieties (e.g., hydrophobic amino-acid moieties). In some embodiments, a low molecular mass organic gelator may include an amino acid derivative. In some embodiments, an amino-acid based compound may include peptides (e.g., dipeptides). Examples of amino acid moieties suitable for certain embodiments of the present disclosure include, but are not limited to phenylalanine, methionine, and the like, and any combination thereof. For example, FIG. 1 shows example low molecular mass organic gelators 1001-1006 suitable for certain embodiments of the present disclosure, including acidic amino acid conjugates of triamide cyclohexane (1001, 1002), neutral amino acid conjugates of triamide cyclohexane (1003, 1004), and basic amino acid conjugates of triamide cyclohexane (1005, 1006), where idem means that all three side chains are identical for that compound. FIG. 1 also shows a low molecular mass organic gelator based on amino acid and oxalic acid 1007, where R may be a phenyl or isopropyl moiety. Examples of amino acid-based compounds suitable for certain embodiments of the present disclosure include, but are not limited to 2,2'-(oxalylbis(azanediyl))bis(2-phenylacetic acid) (compound 1007 where R is a phenyl moiety) and 2,2'-(oxalylbis(azanediyl)) bis(3-methylbutanoic acid) (compound 1007 where R is an isopropyl moiety).

Figure 2:
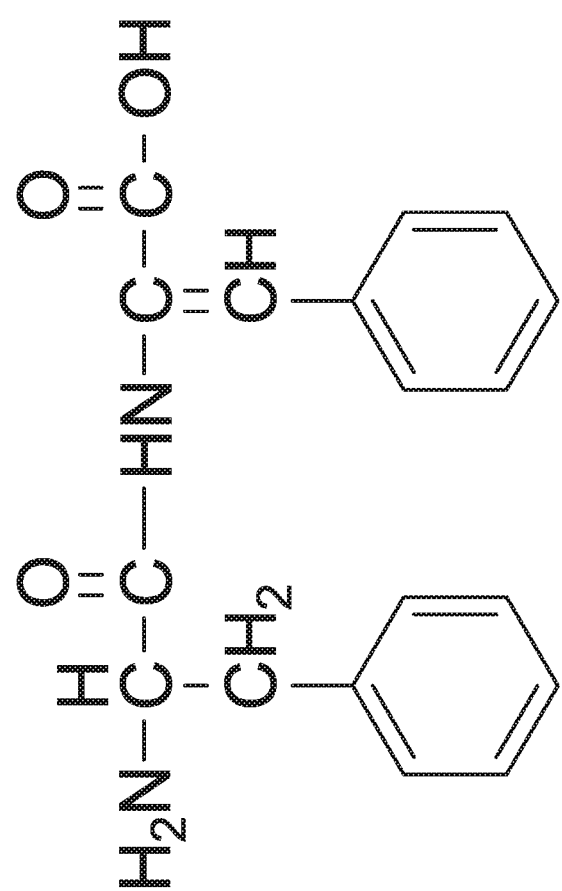
FIG. 2 is a diagram illustrating the chemical structures of a dipeptide low molecular mass organic gelator in accordance with certain embodiments of the present disclosure.
Figure 3:
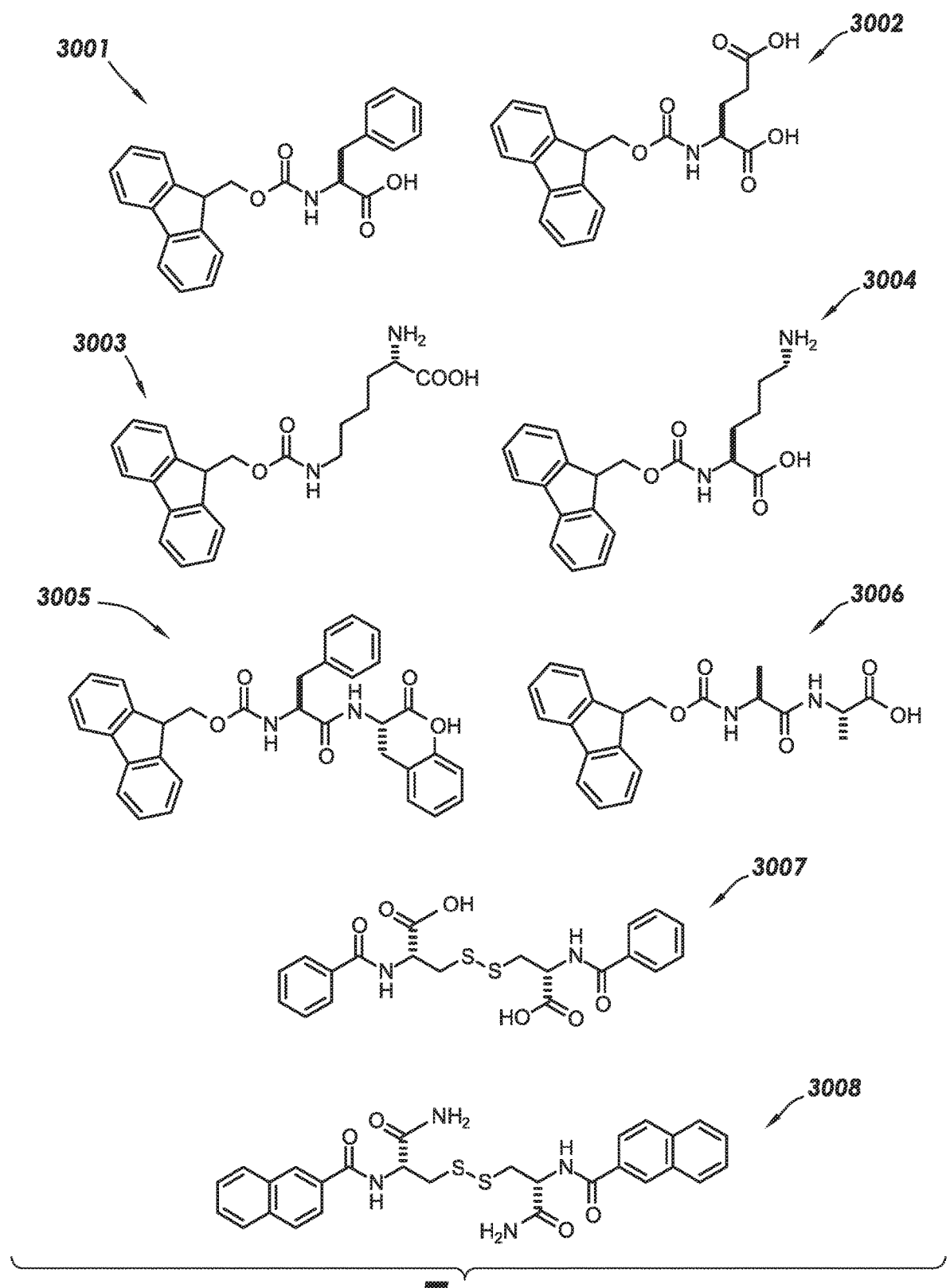
FIG. 3 is a diagram illustrating the chemical structures of low molecular mass organic gelators including fluorenylmethoxycarbonyl and aromatic groups in accordance with certain embodiments of the present disclosure.

In some embodiments, a low molecular mass organic gelator may include a dipeptide including an α,β-dehydrophenylalanine residue or a derivative thereof. FIG. 2 shows the molecular structure of an example of a low molecular mass organic gelator including a dipeptide that includes an α,β-dehydrophenylalanine residue. In some embodiments, an amino acid-based low molecular mass organic gelator may include one or more fluorenylmethoxycarbonyl (Fmoc) groups. In some embodiments, a low molecular mass organic gelator may include one or more aromatic moieties (e.g., phenyl, benzyl, napthyl, napthenyl). FIG. 3 shows the molecular structure of examples of low molecular mass organic gelators 3001-3008 including Fmoc groups (3001-3006) and aromatic groups (3007, 3008). Examples of low molecular mass organic gelators including aromatic moieties suitable for certain embodiments of the present disclosure include, but are not limited to (((9H-fluoren-9-yl) methoxy)carbonyl)phenylalanine (compound 3001), (((9H-fluoren-9-yl)methoxy)carbonyl)glutamic acid (compound 3002), $N^6$-(((9H-fluoren-9-yl)methoxy)carbonyl)lysine (compound 3003), (((9H-fluoren-9-yl)methoxy)carbonyl) lysine (compound 3004), (((9H-fluoren-9-yl)methoxy)carbonyl)phenylalanylphenylalanine (compound 3005), (((9H-fluoren-9-yl)methoxy)carbonyl)alanylalanine (compound 3006), 3,3'-disulfanediylbis(2-benzamidopropanoic acid) (compound 3007), and S-((2-(2-naphthamido)-3-amino-3-oxopropyl)thio)-N-(2-naphthoyl)cysteine (compound 3008).

Figure 4:
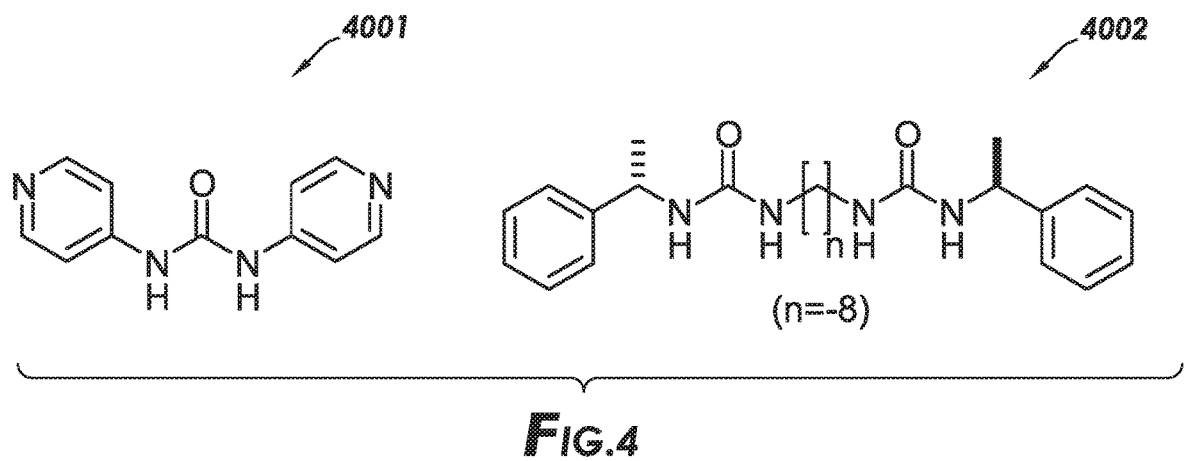
FIG. 4 is a diagram illustrating the chemical structures of low molecular mass organic gelators including urea in accordance with certain embodiments of the present disclosure.
Figure 5:
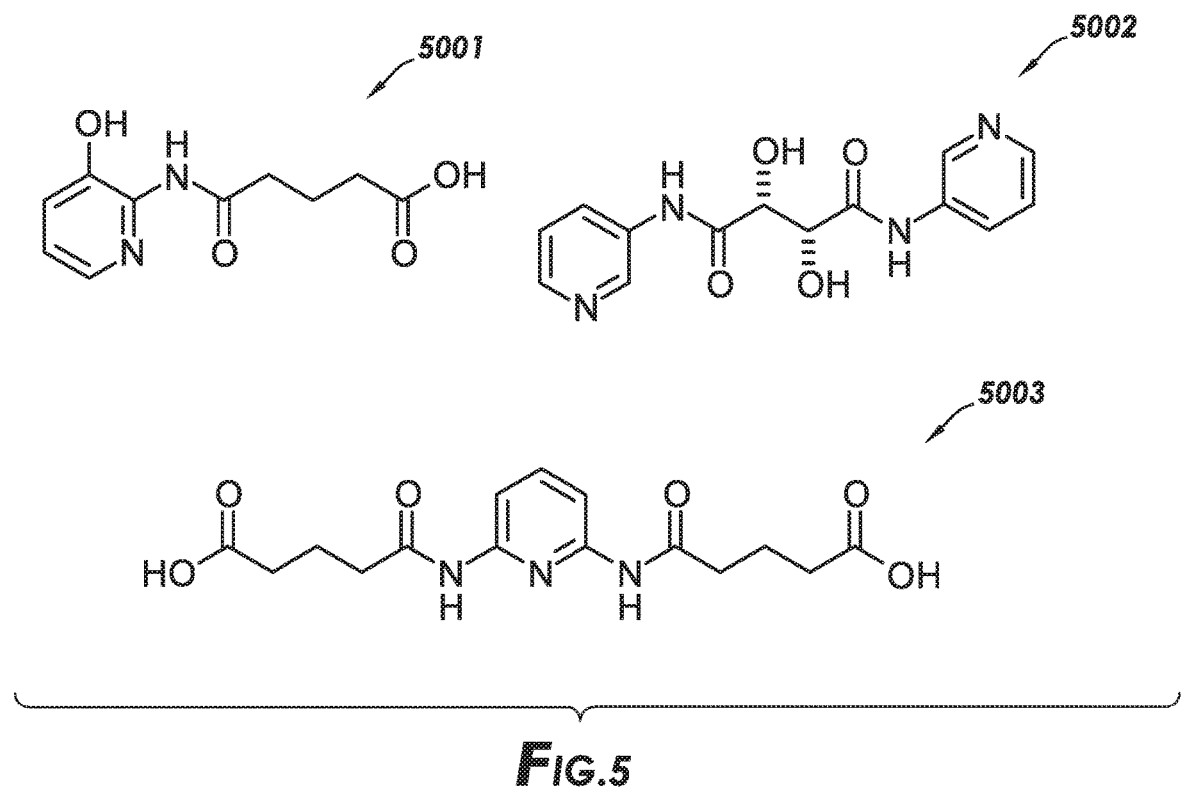
FIG. 5 is a diagram illustrating the chemical structures of low molecular mass organic gelators including pyridine in accordance with certain embodiments of the present disclosure.

In certain embodiments, the low molecular mass organic gelator may include urea. FIG. 4 shows example low molecular mass organic gelators 4001, 4002 that include urea. Compound 4002 has a central alkyl chain where n is between 2 and 8. Examples of low molecular mass organic gelators including urea suitable for certain embodiments of the present disclosure include, but are not limited to 1,3-di (pyridin-4-yl)urea (compound 4001), 1,1'-(ethane-1,2-diyl) bis(3-(1-phenylethyl)urea) (compound 4002 where n is 2), 1,1'-(propane-1,3-diyl)bis(3-(1-phenylethyl)urea) (compound 4002 where n is 3), 1,1'-(butane-1,4-diyl)bis(3-(1-phenylethyl)urea) (compound 4002 where n is 4), 1,1'-(pentane-1,5-diyl)bis(3-(1-phenylethyl)urea) (compound 4002 where n is 5), 1,1'-(hexane-1,6-diyl)bis(3-(1-phenylethyl)urea) (compound 4002 where n is 6), 1,1'-(heptane-1,7-diyl)bis(3-(1-phenylethyl)urea) (compound 4002 where n is 7), and 1,1'-(octane-1,8-diyl)bis(3-(1-phenylethyl)urea) (compound 4002 where n is 8). In certain embodiments, the low molecular mass organic gelator may include pyridine. FIG. 5 shows example low molecular mass organic gelators 5001-5003 that include pyridine. Examples of low molecular mass organic gelators including pyridine suitable for certain embodiments of the present disclosure include, but are not limited to 5-((3-hydroxypyridin-2-yl)amino)-5-oxopentanoic acid (compound 5001), 2,3-dihydroxy-$N^1$,$N^4$-di (pyridin-3-yl)succinimide (compound 5002), and 5,5'-(pyridine-2,6-diylbis(azanediyl))bis(5-oxopentanoic acid) (compound 5003).

Figure 6:
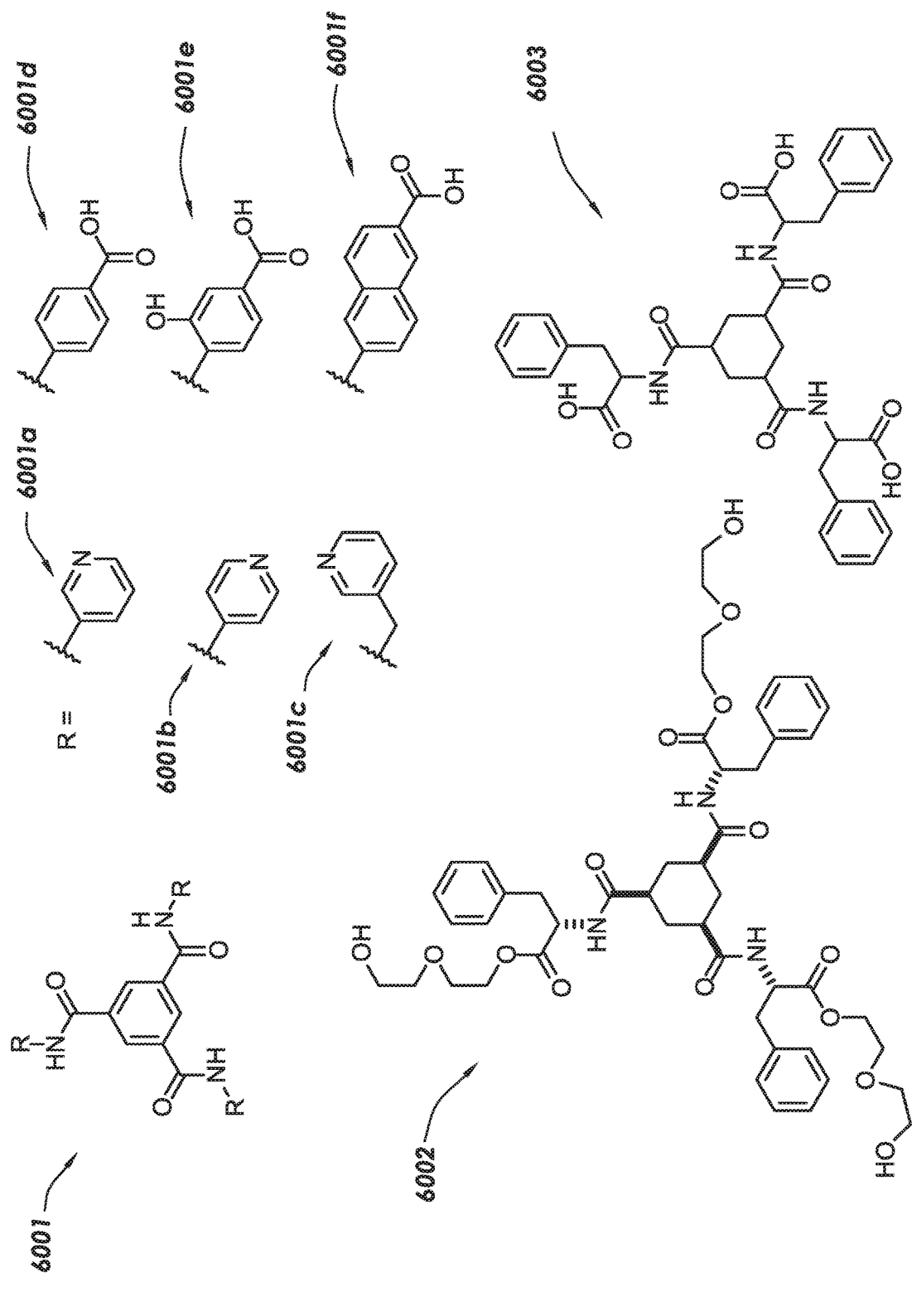
FIG. 6 is a diagram illustrating the chemical structures of low molecular mass organic gelators having $C_3$ rotational symmetry in accordance with certain embodiments of the present disclosure.

In some embodiments, a low molecular mass organic gelator many include compound having $C_3$ rotational symmetry (e.g., the compound does not change after 120° rotation about an axis). FIG. 6 shows example low molecular mass organic gelators 6001-6003 that have $C_3$ rotational symmetry. FIG. 6 also shows example R groups 6001a-f for compound 6001. Compounds 1001-1006 of FIG. 1 are also examples of low molecular mass organic gelators having $C_3$ rotational symmetry. Examples of low molecular mass organic gelators having $C_3$ rotational symmetry suitable for certain embodiments of the present disclosure include, but are not limited to $N^1$,$N^3$,$N^5$-tri(pyridin-3-yl)benzene-1,3,5-tricarboxamide (compound 6001 with R groups 6001a), $N^1$,$N^3$,$N^5$-tri(pyridin-4-yl)benzene-1,3,5-tricarboxamide (compound 6001 with R groups 6001b), $N^1$,$N^3$,$N^5$-tris(pyridin-3-ylmethyl)benzene-1,3,5-tricarboxamide (compound 6001 with R groups 6001c), 4,4',4"-((benzene-1,3,5-tricarbonyl)tris(azanediyl))tribenzoic acid (compound 6001 with R groups 6001d), 4,4',4"-((benzene-1,3,5-tricarbonyl)tris (azanediyl))tris(3-hydroxybenzoic acid) (compound 6001 with R groups 6001e), 6,6',6"-((benzene-1,3,5-tricarbonyl) tris(azanediyl))tris(2-naphthoic acid) (compound 6001 with R groups 6001f), and tris(2-(2-hydroxyethoxy)ethyl)2,2',2"-((cyclohexane-1,3,5-tricarbonyl)tris(azanediyl))tris(3-phenylpropanoate) (compound 6002).

Figure 7:
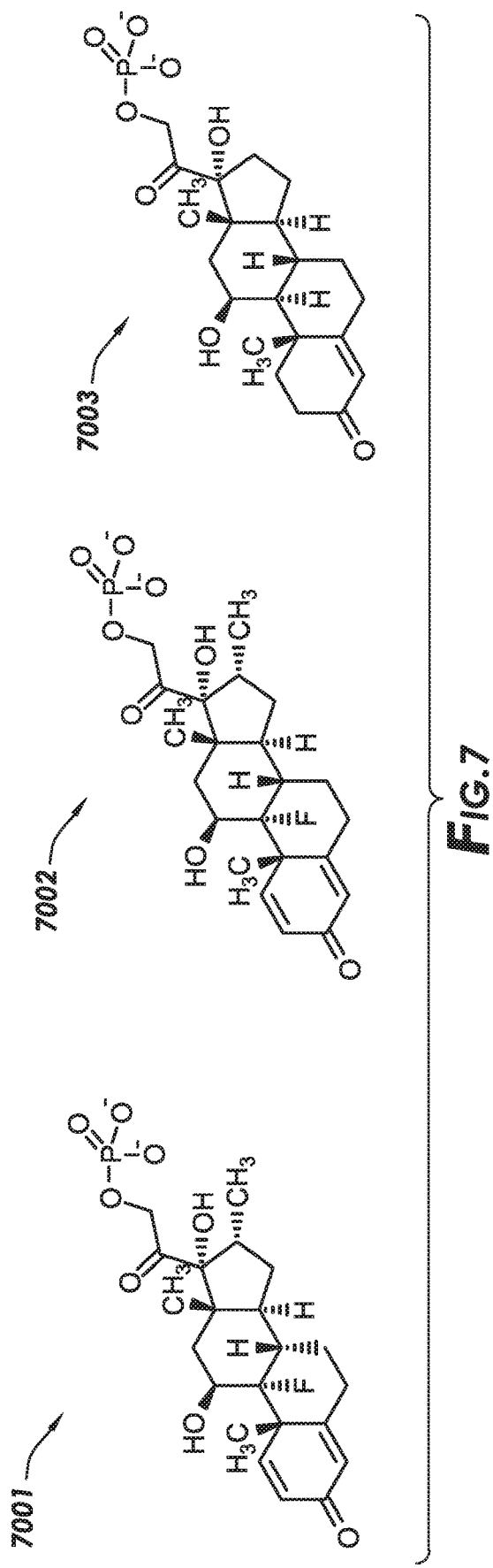
FIG. 7 is a diagram illustrating the chemical structures of low molecular mass organic gelators in accordance with certain embodiments of the present disclosure.

In certain embodiments, examples of low molecular mass organic gelators include, but are not limited to a cyclohexane amino acid conjugate, a bolaform amino acid derivative, a 1,3,5-triamide cis,cis-cyclohexane, a derivative of the foregoing, or any combination thereof. FIG. 7 depicts molecular structures of dexamethasone phosphate 7001, betamethasone phosphate 7002, and hydrocortisone phosphate 7003. In some embodiments, the additive of the present disclosure may include one or more salts. Examples of salts suitable for certain embodiments of the present disclosure include, but are not limited to alkali metal salts, alkaline earth metal salts, ammonium salts, transition metal salts, and any combination thereof. In certain embodiments, the additive of the present disclosure may include a salt including $Mg^{2+}$, $Ca^{2+}$, $Ba^{2+}$, and any combination thereof.

In some embodiments, one or more properties of the low molecular mass organic gelator may be tuned by the inclusion or omission of moieties or functional groups. Examples of tunable properties of low molecular mass organic gelator according to certain embodiments of the present disclosure include, but are not limited to sensitivity to pH, sensitivity to temperature, sensitivity to ion presence, and the like. For example, in some embodiments, a low molecular mass organic gelator with certain functional groups may be selected in order to cause a treatment fluid including that gelator to viscosify or gel at a particular pH or temperature, or in the presence of certain conditions (e.g., ionic conditions). In some embodiments, a low molecular mass organic gelator may be tuned by changing the number of hydrophobic substituents, changing the number of hydrogen-bonding moieties, adding or removing pH-sensitive moieties, adding or removing temperature-sensitive moieties, and any combination thereof. In some embodiments, a low molecular mass organic gelator may not viscosify or form a gel in a treatment fluid in ambient or wellbore circulation conditions, but may viscosify or form a gel (e.g., a hydrogel) in response to one or more conditions in a subterranean formation. For example, in certain embodiments, the low molecular mass organic gelator may viscosify and/or form a gel in the subterranean formation in response to increased temperature in the subterranean formation as compared to the surface or wellbore, reduced pH of the pore fluid in the subterranean formation as compared to the pH of the treatment fluid, the presence or increased concentration of one or more ions in the subterranean formation as compared to the treatment fluid, and any combination thereof.

As used herein, the term "set" refers to the process of a liquid material transitioning to a more viscous, harder, or more solid material by curing. For example, in certain embodiments, a fluid may be considered "set" when the shear storage modulus is greater than the shear loss modulus of the fluid. In certain embodiments, a fluid may be considered "set" or at least partially set when it forms a gel. In some embodiments, the methods of the present disclose may include introducing at least a portion of the treatment fluids into at least a portion of a subterranean formation and causing or allowing the treatment fluid to at least partially set (e.g., form a solid, semi-solid, gel, plug, etc.). In some embodiments, at least a portion of the low molecular mass organic gelator may form a hydrogel in the subterranean formation. In some embodiments, the viscosification and/or gelation of the low molecular mass organic gelator may not include crosslinking. In some embodiments, the additive and/or treatment fluids of the present disclosure may include no more than 0.1% by weight of any crosslinkable compound that crosslinks in the treatment fluid at ambient and/or downhole conditions.

In some embodiments, a low molecular mass organic gelator of the present disclosure may form a reversible gel or reversibly viscosified fluid with the pore fluid in shale that may be almost completely broken and removed from a subterranean formation. As used herein, in the context of viscosity increase provided by a use of low molecular mass organic gelator, the term "break" or "broken" as used herein refers to a reduction in the viscosity of a fluid or gel. In some embodiments, the gel or viscosified fluid formed by the low molecular mass organic gelator in the subterranean formation may be broken by a change in pH, a change in temperature, the passage of time, the presence of hydrocarbons (e.g., caused by production of the well), the introduction of a breaker additive, and any combination thereof. Examples of breaker additives suitable for certain embodiments of the present disclosure include, but are not limited to acids, bases, oxidizers, enzymes, chelating agents (e.g., EDTA), or any combination thereof. The acids, oxidizers, or enzymes may be in the form of delayed-release or encapsulated breakers. In some embodiments, a breaker additive may be introduced into the wellbore in a second treatment fluid and brought into contact with the fluid viscosified or gelled by the low molecular mass organic gelator.

In certain embodiments, the additive of the present disclosure, a treatment fluid, and/or a pore fluid may be thixotropic. As used herein, a "thixotropic" material is a material for which viscosity decreases over time when using a constant or increasing shear rate. As shear rate decreases, the material gradually recovers the original internal structure. Shear rate may be increased, for example, by pumping the treatment fluid. In some embodiments, the low molecular mass organic gelator may impart a thixotropic or a substantially thixotropic behavior to a treatment fluid. In some embodiments, a low molecular mass organic gelator may be present in a sufficient amount to make the treatment fluid thixotropic.

When used, the additive of the present disclosure may be included in the treatment fluid in any suitable amount depending on, among other factors, the amount and/or molecular weight of the additive of the present disclosure, the pore size of the formation, the pore size of the filter cake, and the like. In certain embodiments, the additive of the present disclosure may be included in the treatment fluid in amount that is from about 0.01% to about 10%, from about 0.1% to about 8%, or from about 1% to about 5%, all by weight of the additive in the treatment fluid. A person of skill in the art with the benefit of this disclosure will recognize suitable amounts of the additive of the present disclosure to include in a treatment fluid based on, among other things, the amount and/or reactivity of shale in the formation, other components of the treatment fluid (e.g., brines), the desired viscosity of the treatment fluid, and other parameters of the operation in which the treatment fluid will be used.

In some embodiments, the wellbore stabilizing additive and/or treatment fluids of the present disclosure are substantially or entirely free of (e.g., do not include) any silicate or aluminate, or includes less than 0.1% by weight of any silicate or aluminate by weight of the additive or treatment fluid. In some embodiments, the wellbore stabilizing additive and/or treatment fluids of the present disclosure are substantially or entirely free of (e.g., do not include) any precipitating compound, or includes less than 0.1% by weight of a precipitating compound by weight of the additive or treatment fluid.

The treatment fluids (e.g., drilling fluids) used in the methods and systems of the present disclosure may include any aqueous base fluid known in the art. The term "base fluid" refers to the major component of the fluid (as opposed to components dissolved and/or suspended therein), and does not indicate any particular condition or property of that fluids such as its mass, amount, pH, etc. Aqueous fluids that may be suitable for use in the methods and compositions of the present disclosure or may be present in the pore fluids may include water from any source. Such aqueous fluids may include fresh water, salt water (e.g., water containing one or more salts dissolved therein), brine (e.g., saturated salt water), seawater, or any combination thereof. In most embodiments of the present disclosure, the aqueous fluids include one or more ionic species, such as those formed by salts dissolved in water. For example, seawater and/or produced water may include a variety of divalent cationic species dissolved therein. In certain embodiments, the density of the aqueous fluid can be adjusted, among other purposes, to provide additional particulate transport and suspension in the compositions of the present disclosure.

In some embodiments, the one or more salts may be present in an amount in a range of from about 15 weight percent (wt %) to about 45 wt % by weight of the treatment fluid. In certain embodiments, the one or more salts may be present in a range of from about 2 wt % to about 60 wt % by weight of the treatment fluid. In some embodiments, the one or more salts may be present in an amount in a range of from about 10 wt % or higher, 40 wt % or higher, or 55 wt % or higher, all by weight of the treatment fluid.

In some examples, an aqueous base fluid may include a monovalent brine or a divalent brine. Examples of monovalent brines suitable for certain embodiments of the present disclosure include, but are not limited to sodium chloride brines, sodium bromide brines, potassium chloride brines, potassium bromide brines, and the like, and any combination thereof. Examples of divalent brines suitable for certain embodiments of the present disclosure include, but are not limited to magnesium chloride brines, calcium chloride brines, calcium bromide brines, and the like, and any combination thereof. In certain embodiments, salts suitable for the one or more salts in the treatment fluids may include, but are not limited to an alkali metal halide salt, an alkaline earth metal halide salt, and any combination thereof. Examples of salts suitable for certain embodiments of the present disclosure include, but are not limited to, sodium chloride, potassium chloride, potassium formate, potassium carbonate, calcium chloride, calcium bromide, cesium formate, and zinc bromide. In certain embodiments, a mixture of suitable salts may be used. In some examples, an aqueous base fluid may be a high density brine. As used herein, the term "high density brine" refers to a brine that has a density of from about 9 pounds per gallon (ppg) to about 20 ppg or greater. In some embodiments, a treatment fluid of the present disclosure may have a density in the range of from about 9.5 ppg to about 12 ppg. In certain embodiments, a treatment fluid of the present disclosure may have a density in a range of from about 8.5 ppg to about 14.5 ppg. In some embodiments, a treatment fluid of the present disclosure may have a density in a range of from about 9 ppg or higher, 12 ppg or higher, or 14 ppg or higher. One of ordinary skill in the art with the benefit of this disclosure will recognize where it is desirable to use a dense brine rather than, among other things, a solid weighting agent.

In certain embodiments, the pH of the aqueous fluid may be adjusted (e.g., by a buffer or other pH adjusting agent) to a specific level, which may depend on, among other factors, the types of additives included in the fluid. One of ordinary skill in the art, with the benefit of this disclosure, will recognize when such density and/or pH adjustments are appropriate. In certain embodiments, the treatment fluids may include a mixture of one or more aqueous fluids with other fluids and/or gases, including but not limited to emulsions, foams, and the like.

In addition to stabilizing the wellbore and/or shale, a low molecular mass organic gelator, in some embodiments, may also increase the viscosity of the treatment fluid. In such embodiments, the low molecular mass organic gelator may be at least partially broken, dissolved, removed, degraded, and the like after the low molecular mass organic gelator has been used in a desired application in the subterranean formation in order to at least partially reduce or prevent formation damage.

In some embodiments, the treatment fluids used in the methods and compositions of the present disclosure optionally may include any number of additional additives. Examples of such additional additives include, but are not limited to, surfactants, acids, salts, proppant particulates, diverting agents, filtration agents, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, additional wellbore stabilizers, shale inhibitors, $H_2S$ scavengers, $CO_2$ scavengers, oxygen scavengers, lubricants, viscosifiers, breakers, weighting agents, relative permeability modifiers, resins, wetting agents, coating enhancement agents, pH control agents, filter cake removal agents, antifreeze agents (e.g., ethylene glycol), and the like. A person skilled in the art, with the benefit of this disclosure, will recognize the types of additives that may be included in the fluids of the present disclosure for a particular application. In certain embodiments, the treatment fluids of the present disclosure do not include any shale inhibitors or clay stabilizers other the additive of the present disclosure.

The treatment fluids of the present disclosure may be prepared using any suitable method and/or equipment (e.g., blenders, mixers, stirrers, etc.) known in the art at any time prior to their use. The treatment fluids may be prepared at least in part at a well site or at an offsite location. In certain embodiments, the additives of the present disclosure and/or other components of the treatment fluid may be metered directly into a base treatment fluid to form a treatment fluid. In certain embodiments, the base fluid may be mixed with the additives of the present disclosure and/or other components of the treatment fluid at a well site where the operation or treatment is conducted, either by batch mixing or continuous ("on-the-fly") mixing. The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. In other embodiments, the treatment fluids of the present disclosure may be prepared, either in whole or in part, at an offsite location and transported to the site where the treatment or operation is conducted. In introducing a treatment fluid of the present disclosure into a portion of a subterranean formation, the components of the treatment fluid may be mixed together at the surface and introduced into the formation together, or one or more components may be introduced into the formation at the surface separately from other components such that the components mix or intermingle in a portion of the formation to form a treatment fluid. In either such case, the treatment fluid is deemed to be introduced into at least a portion of the subterranean formation for purposes of the present disclosure.

The present disclosure in some embodiments provides methods for using the treatment fluids to carry out a variety of subterranean treatments, including but not limited to, hydraulic fracturing treatments, acidizing treatments, and drilling operations. In some embodiments, the treatment fluid such as a drilling fluid of the present disclosure may be introduced into at least a portion of a wellbore as it is drilled to penetrate at least a portion of a subterranean formation. The drilling fluid may be circulated in the wellbore during drilling, among other reasons, to cool and/or lubricate a drill bit and/or drill pipe to prevent them from sticking to the walls of the wellbore, prevent blowouts by serving as a hydrostatic head to counteract the sudden entrance into the wellbore of high pressure formation fluids, suspend or remove formation cuttings from the wellbore, and/or enhance the stability of the wellbore during drilling.

Figure 8:
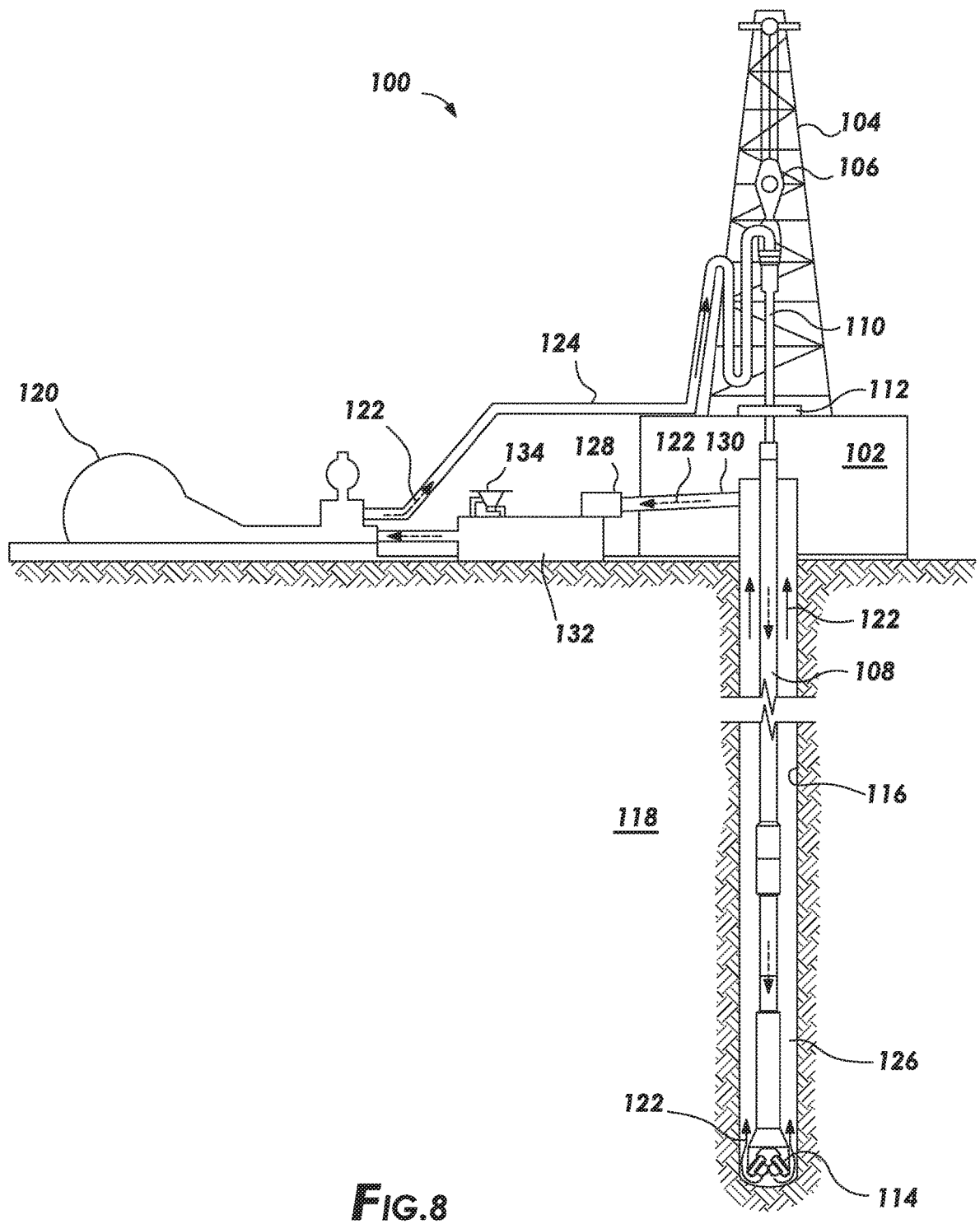
FIG. 8 is a diagram illustrating an example of a wellbore drilling assembly that may be used in accordance with certain embodiments of the present disclosure.

The treatment fluids and additives of the present disclosure may directly or indirectly affect one or more components or pieces of equipment associated with the preparation, delivery, recapture, recycling, reuse, and/or disposal of the treatment fluids and additives. For example, and with reference to FIG. 8, the treatment fluids and additives of the present disclosure may directly or indirectly affect one or more components or pieces of equipment associated with an exemplary wellbore drilling assembly 100, according to one or more embodiments. It should be noted that while FIG. 8 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

One or more of the additives of the present disclosure may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the additives of the present disclosure may be added to the drilling fluid 122 at any other location in the drilling assembly 100. In at least one embodiment, for example, there could be more than one retention pit 132, such as multiple retention pits 132 in series. Moreover, the retention put 132 may be representative of one or more fluid storage facilities and/or units where the additives of the present disclosure may be stored, reconditioned, and/or regulated until added to the drilling fluid 122.

As mentioned above, the additives of the present disclosure may directly or indirectly affect the components and equipment of the drilling assembly 100. For example, the additives may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment, and any combination thereof. The fluid processing unit(s) 128 may further include one or more sensors, gauges, pumps, compressors, and the like used store, monitor, regulate, and/or recondition the additives of the present disclosure.

The additives of the present disclosure may directly or indirectly affect the pump 120, which representatively includes any conduits, pipelines, trucks, tubulars, and/or pipes used to fluidically convey the treatment fluids downhole, any pumps, compressors, or motors (e.g., topside or downhole) used to drive the treatment fluids into motion, any valves or related joints used to regulate the pressure or flow rate of the treatment fluids, and any sensors (i.e., pressure, temperature, flow rate, etc.), gauges, and/or combinations thereof, and the like. The treatment fluids and additives of the present disclosure may also directly or indirectly affect the mixing hopper 134 and the retention pit 132 and their assorted variations.

The treatment fluids and/or additives of the present disclosure may also directly or indirectly affect the various downhole equipment and tools that may come into contact with the treatment fluids and additives such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The treatment fluids and/or additives of the present disclosure may also directly or indirectly affect any downhole heat exchangers, valves and corresponding actuation devices, tool seals, packers and other wellbore isolation devices or components, and the like associated with the wellbore 116. The treatment fluids and/or additives of the present disclosure may also directly or indirectly affect the drill bit 114, which may include, but is not limited to, roller cone bits, PDC bits, natural diamond bits, any hole openers, reamers, coring bits, etc.

While not specifically illustrated herein, the treatment fluids and/or additives of the present disclosure may also directly or indirectly affect any transport or delivery equipment used to convey the treatment fluids and/or additives of the present disclosure to the drilling assembly 100 such as, for example, any transport vessels, conduits, pipelines, trucks, tubulars, and/or pipes used to fluidically move the treatment fluids and/or additives of the present disclosure from one location to another, any pumps, compressors, or motors used to drive the treatment fluids and/or additives of the present disclosure into motion, any valves or related joints used to regulate the pressure or flow rate of the treatment fluids and/or additives, and any sensors (i.e., pressure and temperature), gauges, and/or combinations thereof, and the like.

An embodiment of the present disclosure is a method that includes: providing a treatment fluid including an aqueous base fluid and an additive including a low molecular mass organic gelator; introducing the treatment fluid into at least a portion of a subterranean formation to contact at least a portion of the subterranean formation that includes shale; and allowing the additive to interact with the shale to at least partially stabilize the shale.

In one or more embodiments described in the preceding paragraph, the additive increases the viscosity of a pore fluid in the subterranean formation. In one or more embodiments described in the preceding paragraph, the additive at least partially reduces a permeability of the shale in at least the portion of the subterranean formation. In one or more embodiments described in the preceding paragraph, the low molecular mass organic gelator is selected from the group consisting of: an amino acid-based compound, a urea compound, a pyridine compound, a cyclohexane-based compound, and any combination thereof. In one or more embodiments described in the preceding paragraph, the low molecular mass organic gelator is selected from the group consisting of: a cyclohexane amino acid conjugate, a bolaform amino acid derivative, a fluorenylmethoxycarbonyl (Fmoc)-diphenylalanine, a dipeptide, dexamethasone phosphate, betamethasone phosphate, hydrocortisone phosphate, N,N'-dipyridyl urea, 1-[3-(decyloxy)phenyl]urea, a bisurea macrocycle, a chiral bisurea, a cyclohexane bisurea, 2,2'-(oxalylbis(azanediyl))bis(2-phenylacetic acid), 2,2'-(oxalylbis(azanediyl))bis(3-methylbutanoic acid), (((9H-fluoren-9-yl)methoxy)carbonyl)phenylalanine, (((9H-fluoren-9-yl)methoxy)carbonyl)glutamic acid, N6-(((9H-fluoren-9-yl)methoxy)carbonyl)lysine, (((9H-fluoren-9-yl)methoxy)carbonyl)lysine, (((9H-fluoren-9-yl)methoxy)carbonyl)phenylalanylphenyl alanine, (((9H-fluoren-9-yl)methoxy)carbonyl)alanylalanine, 3,3'-disulfanediylbis(2-benzamidopropanoic acid), S-((2-(2-naphthamido)-3-amino-3-oxopropyl)thio)-N-(2-naphthoyl)cysteine, 1,3-di(pyridin-4-yl)urea, 1,1'-(ethane-1,2-diyl)bis(3-(1-phenylethyl)urea), 1,1'-(propane-1,3-diyl)bis(3-(1-phenylethyl)urea), 1,1'-(butane-1,4-diyl)bis(3-(1-phenylethyl)urea), 1,1'-(pentane-1,5-diyl)bis(3-(1-phenylethyl)urea), 1,1'-(hexane-1,6-diyl)bis(3-(1-phenylethyl)urea), 1,1'-(heptane-1,7-diyl)bis(3-(1-phenylethyl)urea), 1,1'-(octane-1,8-diyl)bis(3-(1-phenylethyl)urea), 5-((3-hydroxypyridin-2-yl)amino)-5-oxopentanoic acid, 2,3-dihydroxy-N1,N4-di(pyridin-3-yl)succinimide, 5,5'-(pyridine-2,6-diylbis(azanediyl))bis(5-oxopentanoic acid), N1,N3,N5-tri(pyridin-3-yl)benzene-1,3,5-tricarboxamide, N1,N3,N5-tri(pyridin-4-yl)benzene-1,3,5-tricarboxamide, N1,N3,N5-tris(pyridin-3-ylmethyl)benzene-1,3,5-tricarboxamide, 4,4',4"-((benzene-1,3,5-tricarbonyl)tris(azanediyl))tribenzoic acid, 4,4',4"-((benzene-1,3,5-tricarbonyl)tris(azanediyl))tris(3-hydroxybenzoic acid), 6,6',6"-((benzene-1,3,5-tricarbonyl)tris(azanediyl))tris(2-naphthoic acid), tris(2-(2-hydroxyethoxy)ethyl) 2,2',2"-((cyclohexane-1,3,5-tricarbonyl)tris(azanediyl))tris(3-phenylpropanoate), and any combination thereof. In one or more embodiments described in the preceding paragraph, the low molecular mass organic gelator is present in the treatment fluid in an amount of from about 0.1% by weight to about 10% by weight of the treatment fluid. In one or more embodiments described in the preceding paragraph, the low molecular mass organic gelator includes a compound having a molecular mass of 100,000 g/mol or less. In one or more embodiments described in the preceding paragraph, the low molecular mass organic gelator includes a compound having a molecular mass of 10,000 g/mol or less. In one or more embodiments described in the preceding paragraph, the low molecular mass organic gelator includes a compound having a molecular mass of 1,000 g/mol or less. In one or more embodiments described in the preceding paragraph, the low molecular mass organic gelator forms a hydrogel in response to one or more conditions in at least the portion of the subterranean formation.

Another embodiment of the present disclosure is a method that includes: drilling at least a portion of a wellbore to penetrate at least a portion of a subterranean formation that includes shale; circulating a drilling fluid in at least a portion of the wellbore while drilling at least a portion of the wellbore, the drilling fluid including an aqueous base fluid and an additive comprising a low molecular mass organic gelator; and allowing the additive to interact with the shale in the subterranean formation to at least partially stabilize the shale.

In one or more embodiments described in the preceding paragraph, the additive increases the viscosity of a pore fluid in the subterranean formation. In one or more embodiments described in the preceding paragraph, the additive at least partially reduces a permeability of the shale in at least the portion of the subterranean formation. In one or more embodiments described in the preceding paragraph, the low molecular mass organic gelator is selected from the group consisting of: an amino acid-based compound, a urea compound, a pyridine compound, a cyclohexane-based compound, and any combination thereof. In one or more embodiments described in the preceding paragraph, the low molecular mass organic gelator includes a compound having a molecular mass of 100,000 g/mol or less.

Another embodiment of the present disclosure is a composition that includes: an aqueous base fluid; an additive including a low molecular mass organic gelator; and one or more salts, the composition having a density of from about 9 ppg to about 20 ppg.

In one or more embodiments described in the preceding paragraph, the composition further includes a bridging agent. In one or more embodiments described in the preceding paragraph, the low molecular mass organic gelator is selected from the group consisting of: an amino acid-based compound, a urea compound, a pyridine compound, a cyclohexane-based compound, and any combination thereof. In one or more embodiments described in the preceding paragraph, the low molecular mass organic gelator is present in the composition in an amount of from about 0.1% by weight to about 10% by weight of the composition. In one or more embodiments described in the preceding paragraph, the low molecular mass organic gelator comprises a compound having a molecular mass of 100,000 g/mol or less.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
    providing a treatment fluid comprising an aqueous base fluid and an additive comprising a low molecular mass organic gelator having a molecular mass of 100,000 g/mol or less, wherein the low molecular mass organic gelator comprises at least one compound selected from the group consisting of: an amino acid-based compound, a urea compound, a cyclohexane-based compound, and any combination thereof;
    introducing the treatment fluid into a wellbore, wherein at least a portion of the low molecular mass organic gelator passes through pores of a filter cake and into a subterranean formation that comprises shale; and then allowing the additive to interact with the shale to stabilize the shale.

2. The method of claim 1, wherein the additive increases a viscosity of a pore fluid in the subterranean formation.

3. The method of claim 1, wherein the additive reduces a permeability of the shale in at least the portion of the subterranean formation.

4. The method of claim 1, wherein the low molecular mass organic gelator is selected from the group consisting of: a cyclohexane amino acid conjugate, a bolaform amino acid derivative, a fluorenylmethoxycarbonyl (Fmoc)-diphenylalanine, a dipeptide, dexamethasone phosphate, betamethasone phosphate, hydrocortisone phosphate, N,N'-dipyridyl urea, 1-[3-(decyloxy)phenyl]urea, a bisurea macrocycle, a chiral bisurea, a cyclohexane bisurea, 2,2'-(oxalylbis(azanediyl))bis(2-phenylacetic acid), 2,2'-(oxalylbis(azanediyl))bis(3-methylbutanoic acid), (((9H-fluoren-9-yl)methoxy)carbonyl)phenylalanine, (((9H-fluoren-9-yl)methoxy)carbonyl)glutamic acid, $N^6$-(((9H-fluoren-9-yl)methoxy)carbonyl)lysine, (((9H-fluoren-9-yl)methoxyl)carbonyl)lysine, (((9H-fluoren-9-yl)methoxyl)carbonyl)phenylalanylphenylalanine, (((9H-fluoren-9-yl)methoxyl)carbonyl)alanylalanine, 3,3'-disulfanediylbis(2-benzamidopropanoic acid), S-((2-(2-naphthamido)-3-amino-3-oxopropyl)thio-N-(2-naphthoyl)cysteine, 1,3-di(pyridine-4-yl)urea, 1,1'-(ethane-1,2-diyl)bis(3-(1-phenylethyl)urea, 1,1'-(propane-1,3-diyl)bis(3-phenylethyl)urea), 1,1'-(butane-1,4-diyl)bis(3-(1-phenylethyl)urea), 1,1'-(pentane-1,5-diyl)bis(3-(1-phenylethyl)urea), 1,1'-(hexane-6-diyl)bis(3-(1-phenylethyl)urea, 1,1'-(heptane-1,7-diyl)bis(3-(1-phenylethyl)urea, 1,1'-(octane-1,8-diyl)bis(3-(1-phenylethyl)urea, 5-((3-hydroxypyridin-2-yl)amino)-5-oxopentanoic acid, 2,3-dihydroxy-$N^1$,$N^4$-di(pyridine-3-yl) succinimide, 5,5'-(pyridine-2,6-diylbis(azanediyl))bis(5-oxopentanoid acid), $N^1$,$N^3$,$N^5$-tri(pyridin-3-yl)benzene-1,3,5-tricarboxamide, $N^1$,$N^3$,$N^5$-tri(pyridin-4-yl)benzene-1,3,5-tricarboxamide, $N^1$,$N^3$,$N^5$-tris(pyridin-3-ylmethyl)benzene-1,3,5-tricarboxamide, 4,4',4"-((benzene-1,3,5-tricarbonyl)tris(azanediyl)tribenzoic acid), 4,4',4"-((benzene-1,3,5-tricarbonyl)tris(azanediyl)tri(3-hydroxybenzoic acid), 6,6',6"-((benzene-1,3,5-tricarbonyl)tris(azanediyl)tris(2-naphthoic acid), tris(2-(2-hydroxyethoxy)ethyl) 2,2',2"-((cyclohexane-1,3,5-tricarbonyl)tris(azanediyl))tris(3-phenylpropanoate), and any combination thereof.

5. The method of claim 1, wherein the low molecular mass organic gelator is present in the treatment fluid in an amount of from about 0.1% by weight to about 10% by weight of the treatment fluid.

6. The method of claim 1, wherein the low molecular mass of organic gelator has a molecular mass of 10,000 g/mol or less.

7. The method of claim 1, wherein the low molecular mass organic gelator has a molecular mass of 1,000 g/mol or less.

8. The method of claim 1, wherein the low molecular mass organic gelator forms a hydrogel in response to one or more conditions in at least the portion of the subterranean formation.

9. A method comprising:
drilling at least a portion of a wellbore to penetrate at least a portion of a subterranean formation that comprises shale;

circulating a drilling fluid in at least a portion of the wellbore while drilling at least a portion of the wellbore, the drilling fluid comprising an aqueous base fluid and an additive comprising a low molecular mass organic gelator having a molecular mass of 100,000 g/mol or less, wherein the low molecular mass organic gelator comprises at least one compound selected from the group consisting of: an amino acid-based compound, a urea compound, a cyclohexane-based compound, and any combination thereof; and then allowing the additive to interact with the shale in the subterranean formation to stabilize the shale.

10. The method of claim 9, wherein the additive increases a viscosity of a pore fluid in the subterranean formation.

11. The method of claim 9, wherein the additive reduces a permeability of the shale in at least the portion of the subterranean formation.

12. The method of claim 9, wherein the low molecular mass organic gelator has a molecular mass of 100,000 g/mol or less.

13. A composition comprising:
an aqueous base fluid;
a shale inhibitor;
an additive comprising a low molecular mass organic gelator having a molecular mass of 100,000 g/mol or less, wherein the low molecular mass organic gelator comprises at least one compound selected from the group consisting of: an amino acid-based compound, a urea compound, a cyclohexane-based compound, and any combination thereof; and
one or more salts,
the composition having a density of from about 9 ppg to about 20 ppg.

14. The composition of claim 13, further comprising a bridging agent.

15. The composition of claim 13, wherein the low molecular mass organic gelator is present in the composition in an amount of from about 0.1% by weight to about 10% by weight of the composition.

16. The composition of claim 13, wherein the low molecular mass organic gelator has a molecular mass of 1,000 g/mol or less.

17. The composition of claim 13, wherein the composition is free of metal crosslinking agent.

* * * * *